United States Patent [19]

Pergent et al.

[11] Patent Number: 5,432,945
[45] Date of Patent: Jul. 11, 1995

[54] OUTPUT CONTROL AND PROTECTION DEVICE, IN PARTICULAR FOR PROGRAMMABLE AUTOMATIC CONTROLLERS

[75] Inventors: Jacky Pergent, Carros Le Neuf; Pierre Gohl, La Colle Sur Loup, both of France

[73] Assignee: Telemecanique, France

[21] Appl. No.: 940,401

[22] Filed: Sep. 3, 1992

[30] Foreign Application Priority Data

Sep. 5, 1991 [FR] France ................... 91 10972

[51] Int. Cl.⁶ ............................................. G06F 1/28
[52] U.S. Cl. ........................... 395/750; 361/98; 361/90
[58] Field of Search .............. 395/750, 275; 361/18, 361/31, 2, 98, 86, 101, 90

[56] References Cited

U.S. PATENT DOCUMENTS

| | | | |
|---|---|---|---|
| 4,053,996 | 10/1977 | Schertz et al. | 361/98 |
| 4,104,731 | 8/1979 | Grudowski et al. | 395/275 |
| 4,473,856 | 9/1984 | Takahashi et al. | 361/31 |
| 4,551,779 | 11/1985 | Mutakami et al. | 361/86 |
| 4,628,397 | 12/1986 | Gareis et al. | 361/98 |
| 4,783,714 | 11/1988 | Kalina | 361/101 |
| 4,879,625 | 11/1989 | Potenzone | 361/90 |
| 4,912,619 | 3/1990 | Arcus | 361/111 |
| 4,916,569 | 4/1990 | Konopka | 361/18 |
| 4,951,250 | 8/1990 | Cruickshank et al. | 395/275 |
| 4,965,692 | 10/1990 | Burns et al. | 361/18 |
| 5,138,513 | 8/1992 | Weinstein | 361/2 |

FOREIGN PATENT DOCUMENTS

| | | |
|---|---|---|
| 2606274 | 11/1986 | France . |
| 2650451 | 7/1989 | France . |
| 2726537 | 6/1977 | Germany . |

Primary Examiner—Jack B. Harvey
Assistant Examiner—Ayaz R. Sheikh
Attorney, Agent, or Firm—William A. Drucker

[57] ABSTRACT

A device for controlling and protecting outputs against overcurrents, in particular for programmable automatic controllers, comprises for each output channel a protection circuit connected by a single terminal to a power switch and to its control circuit. In the protection circuit a comparator compares with a threshold a voltage imaging the current in the output channel and disabling means are connected to a circuit for forcing the comparator input voltage. A common terminal is therefore used to monitor and to disable the output channel.

5 Claims, 1 Drawing Sheet

OUTPUT CONTROL AND PROTECTION DEVICE, IN PARTICULAR FOR PROGRAMMABLE AUTOMATIC CONTROLLERS

BACKGROUND OF THE INVENTION

1. Field of the Invention

The present invention concerns a DC output control and protection device for a programmable control system such as a programmable automatic controller.

2. Description of the Prior Art

It is known to protect DC outputs of a programmable automatic controller against short circuits by means of a protection circuit associated with each output channel. A circuit of this kind usually comprises a processor unit of which an input pin is connected to an overcurrent detector which is associated with the output channel. The processor unit compares the detected current level with a threshold and delivers a signal if the current exceeds the threshold; the resulting signal is filtered and then applied to resettable storage logic means, such as a flip-flop, the output of which is connected to an output pin of the protection circuit. The disabling signal available at this output pin is applied to the inverting input of an AND gate which also receives a control signal from a processor or from a control unit of the programmable automatic controller; the output of the AND gate is applied to a power switch which controls the opening and the closing of the output channel according to the control signal and the disabling signal or a reset instruction.

The protection circuit therefore requires two connecting pins to acquire the current information and to disable the output affected by a short circuit. However, it would be desirable to protect the output channels by means of an integrated circuit having a minimal number of connecting pins.

A particular object of the invention is to simplify the connection of a protection device for DC outputs in a programmable system such as a programmable automatic controller, more specifically by acquiring the overcurrent information relating to an output and disabling the latter by means of a common connection.

SUMMARY OF THE INVENTION

The invention consists in a DC output channel control and protection device, in particular for programmable automatic controllers, comprising for each output channel:
  an electronic power switch for opening and closing the output,
  a circuit for controlling the switch and a circuit for protecting the output against overcurrents, this latter circuit comprising:
    detector means for delivering a voltage imaging the current at the output,
    a comparator for receiving on a first input the current image voltage and on a second input a reference voltage, the output of said comparator being connected via a filter to means adapted to disable said channel if said output changes state in response to an overcurrent of a duration exceeding the filtering time.

According to the invention, the protection circuit has a single connection terminal to the control circuit and to the power switch, this terminal being connected to the first input of the comparator to monitor the current image voltage and to disable the output, and the disabling means have an output connected to a circuit forcing the first input of the comparator to maintain the disabling of the switch in response to detection of an overcurrent.

In a particularly simple manner the disabling means comprise storage means which receive on an activation input the filtered output of the comparator and on a de-activation input a reset signal, the output of the logic means driving a forcing switch disposed between the first input of the comparator and a voltage source or sink.

The following description with reference to the appended drawings explains the features and advantages of one embodiment of the invention.

DETAILED DESCRIPTION OF THE INVENTION

Figure 1:
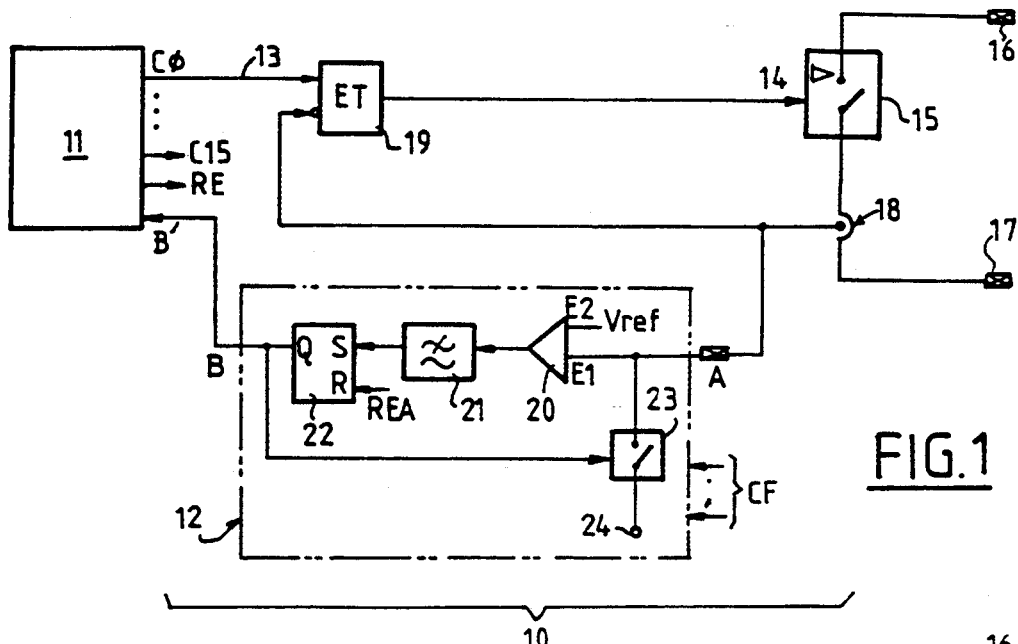
FIG. 1 is a block diagram showing a DC output control and protection device in accordance with the invention.

The control and protection device 10 shown in FIG. 1 is adapted to control and to protect against overcurrents DC outputs of a programmable automatic controller. By overcurrents is meant both overload currents and short circuit currents.

The device 10 comprises for a group of output channels a control unit 11 having outputs C0–Cn and n protection circuits 12 each having an input terminal or pin A. Each output, the output C0, for example, is connected by a conductor 13 to a first input of an AND gate 19 whose output is connected to the control terminal 14 of a power switch 15 on a conductor linking two terminals 16, 17 to command the opening and the closing of a load circuit connected to these terminals and including a load that is not shown. The arrangements relating to a single output channel will be described with reference to FIG. 1.

A detector 18 responsive to the current flowing through the load circuit (in the form of a carefully placed resistor, for example) is connected to the terminal A. This terminal is connected to a first input E1 of a comparator 20 whose output is connected to a low-pass filter 21. A reference potential Vref is applied to a second input E2 of the comparator; the output state of the comparator changes if the current image voltage at E1 exceeds the threshold. The output of the filter 21 is connected to an input of an RS flip-flop 22 which stores the aforementioned change of state. According to the invention the output Q of the flip-flop 22 is looped to the control terminal of a forcing switch 23 adapted to connect the terminal A to a voltage source or sink 24. The choice of a voltage source or sink depends on the required application of the device 10 and is effected by configuration signals CF. The switch 23 is used to maintain the voltage at terminal A at a forced level determined by the source or the sink 24 after detection of an overcurrent and until a reset signal REA is applied to the flip-flop 22. The terminal A is connected to an inverting input of the AND gate 19 implemented by any known means.

The signal available at the output Q of the flip-flop 22 of the circuit 12 is sent to the control unit 11, for example by means of a parallel link for the circuits 12 of the various output channels, or preferably by means of a serial link which uses a parallel-serial register to combine the signals B0–B15 from the flip-flops 22 of the various channels into cyclic messages B'. After registering that an overcurrent has been detected, the control unit 11 sends the circuit 12 a reset signal RE which is converted into the reset signal REA applied to the flip-flop 22.

Figure 2:
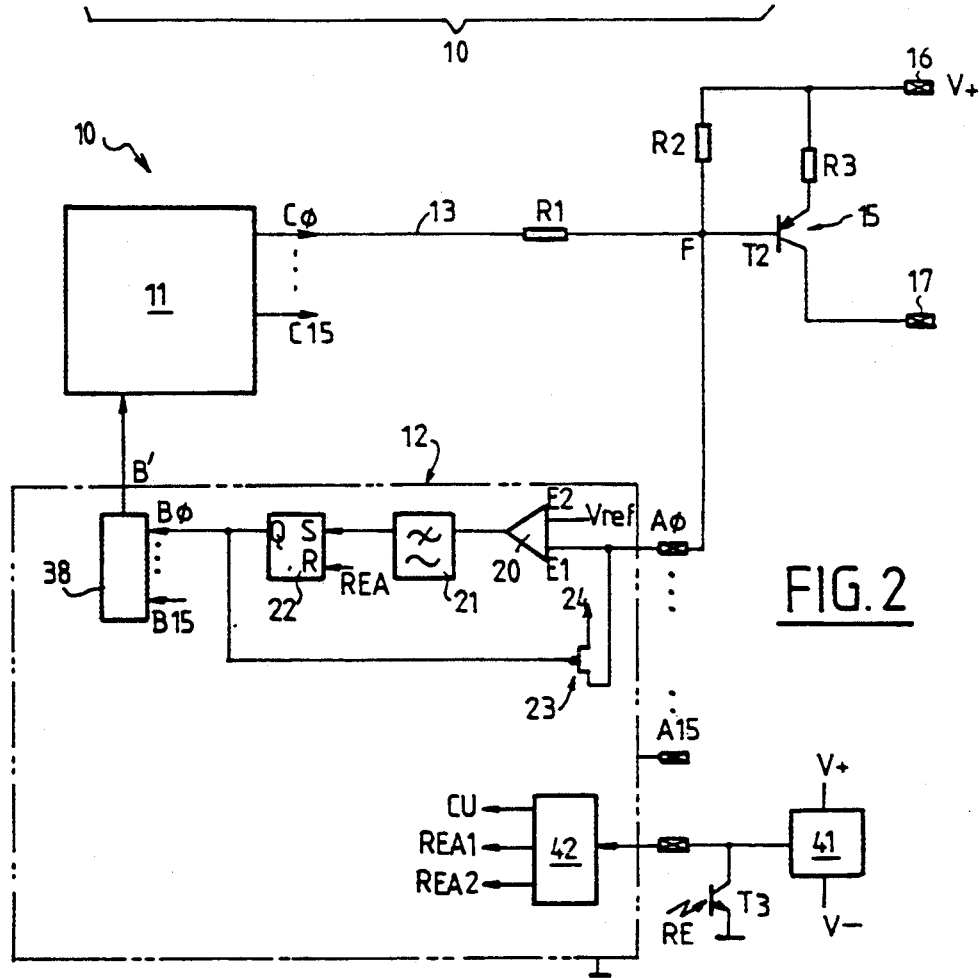
FIG. 2 shows one embodiment of the invention in more detail.

In the FIG. 2 embodiment the device is used to control and protect low-current (nominal current 0.1 A, for example) outputs.

The power switch 15 is a PNP bipolar transistor T2 whose base F is directly connected to the terminal A, to the conductor 13 via a resistor R1 and to the terminal 16 at a potential V+ of 24 volts, for example, via a resistor R2. The emitter of the transistor T2 is connected to the terminal 16 by a resistor R3 and its collector is connected to the output terminal 17.

The protection circuit 12 comprises a filter whose filter time is adapted to suit the application; a variable frequency oscillator which is part of the circuit 12 is provided for this purpose; in this way an overcurrent fault is not registered by the flip-flop 22 until the end of a time period determined by the filter (10 ms, for example). The output of the flip-flop 22 is looped to the gate of a P-channel MOS transistor 23 adapted to connect the terminal A to a voltage supply 24 and connected to one of the 16 inputs B0–B15 of a parallel-serial register 38 whose output B' is sent to the control unit 11. The circuits 12 of the various channels are grouped together in an integrated circuit with a voltage monitor device to be described later.

A voltage detector 41 monitors the supply voltage of the group of outputs and is connected to a terminal AU of the device 10. The voltage at AU is processed by a circuit 42 of the device 10 to generate a fault signal if this voltage is too low. To save on connecting pins there is provision for forcing the terminal AU by the reset signal RE when the latter is supplied by the control unit 11 and applied to an optocoupler T3. The fault signal is sent to the circuit 42 which discriminates resets from loss of voltage. The circuit generates a voltage fault signal CU and two signals REA1, REA2 each of which is adapted to reset a group of eight channels by resetting the flip-flops 22 after detection of a short circuit and disabling of the corresponding output.

The operation of the device in accordance with the invention will now be described with reference to FIG. 2.

If the output C of the control unit 11 is at logic state 1, the transistor T2 is turned off. If the output C is at logic state 0, a current determined by the resistor R1 flows in the conductor 13 and the transistor T2 is turned on provided that the current in the load circuit remains nominal; the connection of the protection circuit 12 does not modify the potential at the point F. If a short circuit occurs in the load circuit, the voltage VF at the point F becomes lower than Vref, the output of the comparator 20 changes state and this is registered by the flip-flop 22 if the duration of the overcurrent exceeds the filtering time of the filter 21. The change of state at the output Q of the flip-flop is sent to the gate of the transistor 23 which is turned on so that the terminal A and the point F are at a forced level which represents the potential of the supply 24 (24 volts, for example) and over the link B' to the control unit 11. The transistor T2 is turned off and the load circuit is therefore opened until a reset signal RE is sent by the control unit 11. This signal is converted in the output circuit 12 into a signal REA1 or REA2 applied to the flip-flop 22 to change the state of the output Q and turn off the transistor 23. After this reset operation the circuit 12 no longer forces the voltage at the points A and F which again depends on the signal C and the presence or the absence of an overcurrent.

The saving on pins resulting from the invention is because the pin A of the protection circuit 12 used to monitor the load circuit is also used to disable the circuit in the event of a fault.

There is claimed:

1. Control and protection device for a DC output channel of a programmable automatic controller, said channel comprising first and second terminals connected therebetween by a switching circuit comprising an electric power switch controlled by a control unit through a control circuit (having a logic circuit) so as to allow a current to flow in said switching circuit, a protection circuit for protecting said switching circuit against overcurrents, said protection circuit having a terminal A on which is applied a detection voltage imaging said current and supplied by a detector means equipping said switching circuit, a comparator having a first input connected to said third terminal, a second input on which is applied a reference voltage and an output which is connected, via a filter having a filtering time to a resettable disabling circuit which applies to said control unit a disabling signal causing said control circuit to generate a control signal when an overcurrent is occurring and as a consequence, the detection voltage has a value which exceeds said reference voltage during a period exceeding said filtering time, said control signal causing said power switch to pass to a disabled state and said resettable disabling circuit further having a switching device which is connected to said first input of said comparator and which applies on said first input a forcing voltage so as to maintain said disabling signal applied to the control unit and to keep said power switch in said disabled position in response to said overcurrent.

2. Device according to claim 1 wherein said resettable disabling circuit comprises storage means for receiving on an activation input the said disabling signal and on a de-activation input a reset signal and the output of said storage means controls a forcing switch connecting said first input of said comparator to a voltage source.

3. Device according to claim 2 wherein said programmable automatic controller comprises several output channels and said protection circuit is an integrated circuit comprising for each DC output channel said detector means, said comparator and a forcing circuit comprising said switching device and for a group of n channels a serial register having parallel inputs connected to said storage means of the various channels and a serial output connected to said control circuit .

4. Device according to claim 1 wherein a signal representing a supply voltage of the DC output channel is applied to an input of said protection circuit to generate a fault signal representing loss of voltage, said input is adapted to be forced by a reset signal and said protection circuit comprises a circuit discriminating between resetting and loss of voltage.

5. Device according to claim 1 wherein said control circuit comprises an AND gate having a first input connected to a control output of the control unit, a second input connected to said third terminal and an output connected to a control terminal of said electric power switch.

* * * * *